E. E. WINKLEY.
MACHINE FOR OPERATING ON SHOE SOLES.
APPLICATION FILED FEB. 14, 1911.

1,152,584.

Patented Sept. 7, 1915.
8 SHEETS—SHEET 1.

E. E. WINKLEY.
MACHINE FOR OPERATING ON SHOE SOLES.
APPLICATION FILED FEB. 14, 1911.

1,152,584.

Patented Sept. 7, 1915.
8 SHEETS—SHEET 7.

UNITED STATES PATENT OFFICE.

ERASTUS E. WINKLEY, OF LYNN, MASSACHUSETTS.

MACHINE FOR OPERATING ON SHOE-SOLES.

1,152,584.

Specification of Letters Patent.

Patented Sept. 7, 1915.

Application filed February 14, 1911. Serial No. 608,489.

*To all whom it may concern:*

Be it known that I, ERASTUS E. WINKLEY, a citizen of the United States, residing at Lynn, in the county of Essex and State of Massachusetts, have invented certain new and useful Improvements in Machines for Operating on Shoe-Soles; and I do hereby declare the following to be a full, clear, and exact description of the invention, such as will enable others skilled in the art to which it appertains to make and use the same.

The invention relates to machines such as are used in the manufacture of shoes for performing various operations upon the shoe sole before it is incorporated in the shoe.

Stock fitting machines, such as machines for turning up and setting the lips of insoles, for applying reinforce material, for channeling the sole, or for performing similar operations, as usually constructed, are provided with tools operating upon the marginal portion of the sole blank, and with devices for supporting and feeding the blank. In the operation of these machines the sole blank is introduced by the operator, and as the operation progresses along the marginal portion of the blank, the blank is swung by the operator to maintain its marginal portion in the line of feed, and in proper relation to the tools.

It is the primary object of the present invention to provide sole machines of this type with novel and improved mechanism for automatically maintaining the marginal portion of the sole blank in proper relation to the operating tools as their point of operation progresses along the sole, whereby the sole may be properly fed to the machine without the assistance of the operator.

In accordance with one feature of the invention, the swinging of the blank as it is fed to the operating tools is effected by devices which intermittently grip the blank and swing it to bring its edge or some other contour thereon into the line of feed at or just in advance of the point of operation of the tools. Sole swinging devices of this character may be arranged adjacent to the operating tools to act progressively along the sole as it is fed to the tools, and are well adapted for operating upon flat sole blanks in machines provided with operating tools which necessarily overlie the sole to a considerable extent. They also enable the use of work supports which will insure the proper presentation of the marginal portion of the sole to the operating tools even when operating upon soles having narrow shanks.

In accordance with another feature of the invention, the devices which feed the sole are also actuated to swing the sole and maintain it in proper relation to the operating tools as they act progressively along the sole edge.

While both of the above features are embodied in the preferred form of the invention by actuating the devices which intermittently grip and swing the blank to also feed the blank, it will be understood that broadly considered this is not essential, and that the invention contemplates the employment of either feature with or without the other feature.

Another feature of the invention contemplates controlling the swinging movements of the intermittent sole gripping devices or of the feeding devices by the edge of the blank or by some other contour on the blank which corresponds to or approximately to the path of travel of the operating tools about the sole edge. In the preferred construction a feeler engages the controlling contour and determines the swinging movement requisite to bring the contour at the point engaged by the feeler into proper relation to the operating tools.

Further features of the invention relate to novel and improved means for automatically slowing down the machine for operating on soles while operating around the toe, and for stopping the machine when the heel is reached.

The invention is shown embodied in a lip turning machine and certain further features of the invention relate to the construction and arrangement of the operating tools of this machine.

In the drawings the invention is shown as embodied in a lip turning machine provided with lip turning, setting and slitting tools similar in general construction and mode of operation to the tools of the Goodyear lip turning machine illustrated in the patent to Hadaway, No. 635,772, dated Oct. 31, 1899. The machine is also provided with devices which at frequently recurring intervals during the feed of the sole blank grip and swing the blank and maintain its marginal portion at the point of operation of the tools in proper relation to the tools as the point of operation progresses about the edge of the sole. The swinging movement requisite to bring the margin of the sole into proper relation to the operating tools at each operation of the sole gripping devices is determined by a feeler which engages the edge of the sole (or some other marginal abutment) in advance of the point of operation of the tools, and controls the extent and direction of movement given to the sole gripping devices by their actuating mechanism. The number of parts operating on the sole is minimized in the machine shown by utilizing the devices which intermittently grip and swing the sole to also feed the sole.

In the machine shown the devices for operating on the marginal portion of the sole consist of a lip turning tool 1 adapted to enter the slit between the feather and lip of the sole, a reciprocating setting and slitting tool 2, and a lip retaining tool 3, which are similar in general construction to the tools of the above patent. The setting and slitting tool is carried upon the front end of a slide 4 which is reciprocated by a cam 5 through a link 6, one end of which is slotted to fit about the cam shaft 7, and the other end of which is pivoted to the slide. The cam is provided with a groove 8 engaging a roll on the link 6. The slide 4 is made in two sections, and a spring 9 is interposed between the sections so that the tool may yield to accommodate itself to the position of the lip, as will be more fully explained hereafter.

Figure 9:
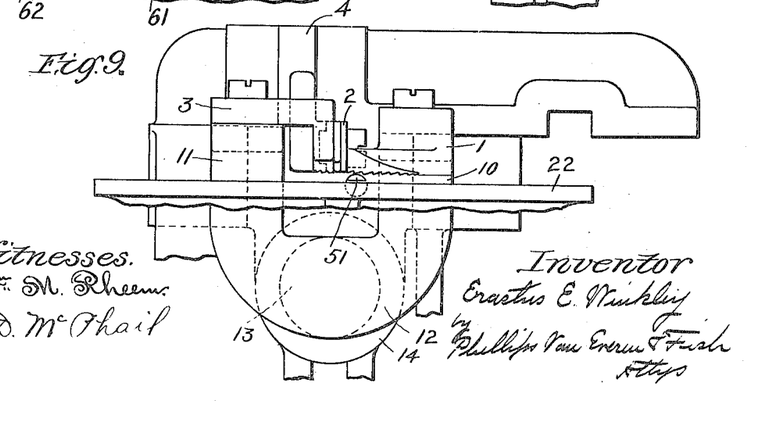
Fig. 9 is a front elevation of the parts shown in Fig. 7.

The lip turning tool 1 and lip retaining tool 3 are adjustably mounted upon the arms 10 and 11 of a yoke 12 formed on the front end of a slide 13. The slide is mounted in a lever 14 and is forced yieldingly forward by a spring 15 so that the tools carried by the yoke may accommodate themselves to the position of the base of the lip with relation to the edge of the sole, as will be more fully explained hereafter. The under surfaces of the tools 1 and 3 which engage the feather of the sole are provided with teeth, as indicated in Fig. 9, and the lever 14 carrying the tools is actuated to force the tools against the feather during the return stroke of the feeding devices and to relieve the pressure during the advance or feeding movement of the feeding devices. The lever 14 is thus actuated through a bell crank lever 16 one arm of which is connected with the lever 14 by a link 17, and the other arm of which is connected by a link 18 with a cam operated lever 19. One arm of the lever 19 carries a roll 20 engaging a cam groove formed in a cam disk 21 which is secured to the cam shaft 7.

The sole is supported in position to be operated upon by the lip setting tools by a flat work supporting table 22 which is secured upon the upper end of a spindle 23. The spindle is mounted in a head 24 and is supported by a spring 25 so that the table may be depressed to enable the sole to be inserted or removed, by a treadle (not shown) connected to the lower end of the spindle.

The devices for feeding the sole comprise a slide 26 mounted in the work supporting table, and a clamping head 27 arranged above the table. The clamping head carries a series of spring pressed pins 28 adapted to engage the upper surface of the sole and to accommodate themselves to variations in the thickness of the sole, and also to yield in case any of them strike upon the turned over lip. The head 27 is mounted in guideways formed in a carrier 29 which is in turn secured to the lower end of a shaft 30. The shaft 30 is mounted in bearings formed in the front end of an arm 31, the rear end of which is provided with a hub 32 mounted to turn about a fixed shaft 33. The arm 31 is oscillated about the shaft 33 to move the gripping head back and forth in the direction of feed, and the shaft 30 is moved vertically to cause the clamping head to grip and release the sole. The guideway in which the feed slide 26 is mounted is concentric with the axis of the shaft 33, and the feed slide is reciprocated in unison with the clamping head.

The devices for reciprocating the arm 31 and slide 26 in the line of feed consist of a link 34 one end of which is connected to the arm 31, and the other end of which is pivotally connected to one end of a lever 35, the other end of which carries a roll engaging a cam 36 secured to the cam shaft 7. The pivotal conenction between the link 34 and lever 35 is adjustable in a slot 37 formed in the end of the lever, so that the connection may be adjusted to vary the feed. The slide 26 is connected to move in unison with the arm 31 through a link 38, one end of which is connected to the arm 31, and the other end of which is connected to a lever 39. The lever 39 is connected by a link 40 with the slide 26. The devices for vertically reciprocating the shaft 30 to cause the feeding devices to grip and release the sole consist of an arm 41 secured to a rock shaft 42 and provided at its outer end with a yoke carrying rolls 43 engaging an annular groove formed in a sleeve 44 secured to the shaft 30. An arm 45 is secured to the end of the rock shaft 42, and is connected through a link 46 with one arm of a bell crank lever 47, the other arm of which carries a roll engaging a cam 48 secured to the cam shaft 7.

Through the mechanism described a to and fro movement is imparted to the slide 26, and a 4-motion movement is imparted to the gripping head 27. During the advance or feeding movement of the gripping head and slide the spring pressed pins 28 are forced against the sole, and the sole is firmly gripped between the pins and the slide 26. The feeding devices continue to hold the sole during the advance of the lip setting and slitting tool. After the lip setting and slitting tool has acted on the lip, the gripping head is raised to disengage the pins 28 from the sole, and the head 27 and slide 26 are retracted, preparatory to the next feeding movement. During this retracting movement of the head and slide the lip turning tool 1 and lip retaining tool 3 are forced downward against the sole by the mechanism hereinbefore described, and the teeth on the under surface of these tools hold the sole against backward movement during the return of the feeding devices. After the slide 26 and head 27 have been returned to initial position, the head 27 is again depressed to force the pins 28 against the sole, and the head and slide 26 are again advanced to feed the sole. During the feeding movement of the sole the tools 1 and 2 are raised slightly to relieve the pressure on the sole.

In order that the sole may yield transversely of the feed in case the lip setting tool applies unusual lateral pressure to the sole, and may be immediately returned to proper position with relation to the lip turning and setting tools when the lip setting tool is retracted, the head 27 is held in position in the transverse guideway in the support 29 by a heavy flat spring 49 which engages a lug 50 on the front end of the head. If the lip setting tool applies sufficient pressure to the base of the lip to displace the sole laterally the spring 49 will yield and will immediately return the head and sole to proper position when the pressure of the setting tool upon the sole is relieved.

The sole gripping head 27 is not only actuated to feed the sole, but is also actuated to swing the sole to maintain its edge in the line of feed and in proper relation to the lip turning and setting tools during the feed of the sole. The head is thus actuated to properly swing the sole by imparting turning movements to the shaft 30, and the extent and direction of these turning movements is controlled and determined by a feeler finger 51 arranged to engage the edge of the sole in advance of the point of operation of the lip setting and turning tools. If the edge of the sole at the point engaged by the feeler is in the line of feed then no turning movement is imparted to the shaft 30, and the sole gripping head merely grips the sole and feeds it forward. If the edge of the sole at this point is out of the line of feed then the feeler is out of neutral position, and a mechanism controlled by the position of the feeler operates to turn the shaft 30 after the sole has been gripped by the head 27 in the proper direction and to the proper extent to bring the edge of the sole into the line of feed. As the feed progresses, therefore, the head 27 is actuated to maintain the edge of the sole in the line of feed, and the marginal portion of the sole is maintained in proper relation to the lip turning and setting tools as their point of operation is transferred around the sole. In the construction shown the edge of the sole is the abutment or contour which controls the swinging movements imparted to the sole, and is the contour the path of travel of which is fixed. It is for this reason that the spring 9 is interposed between the setting and slitting tools and their actuating mechanism, and that the lip turning and retaining tools are forced yieldingly forward by the spring 15. By these yielding connections the lip turning and retaining tools 1 and 3 are caused to travel against the base of the lip, and the lip setting and slitting tool is caused to act properly upon the base of the lip, while the path of travel of the sole is controlled by the edge of the sole, the position of which with relation to the base of the lip varies at different parts of the sole.

The mechanism for actuating the clamping head 27 to swing the blank comprises a segment 52 arranged to engage teeth formed on the hub of the carrier 29. The segment is formed on the front end of a lever 53 pivotally supported on the shaft 33 and having its rear end connected by a link 54 with one arm of a bell crank lever 55 which is secured to a vertical rock shaft 56. The other arm of the bell crank lever carries a roll 57 arranged in a cam groove 58 in a disk 59′ which is secured to the cam shaft 7. The cam groove 58 is considerably broader than the diameter of the roll 57 throughout the greater portion of its length, and is provided with a concentric portion 59 of a width equal to the diameter of the roll.

The groove is provided with converging surfaces 60 leading to the concentric portion 59. So long as the roll 57 is in position to pass through the concentric portion 59 of the cam groove, no rotary movement will be imparted to the shaft 30 and the sole clamping head. If the bell crank lever is turned to bring roll 57 out of position to register with the concentric part 59 of the cam groove, the lever will be returned to neutral position by one of the inclined surfaces 60. The cam is so timed that the roll 57 enters the concentric part 59 of the cam groove just after the sole has been gripped by the clamping head, and the roll remains in the groove during the forward feed of the sole. The position of the roll 57 in the broader part of the cam groove is controlled by the position of the feeler finger 51 through the following mechanism. The feeler is formed on the front end of a rod 61 which is mounted to slide transversely of the feed, and is held yieldingly toward the sole by a spring 62. An arm 63 is secured to the rod and is connected by a link 64 with one arm 65 of a bell crank lever which is mounted on the shaft 66. The other arm 67 of the bell crank lever carries a roll 68, the position of which will depend upon the position of the feeler when in engagement with the edge of the sole. If the edge of the sole at the point where it is engaged by the feeler is in the line of feed, the roll 68 will be in neutral position. If the point engaged by the feeler is out of the line of feed, the roll will be at one side or the other of its neutral position. The position of the roll 68 determines the swinging movement which is imparted to the blank gripping head by the cam 58 through the following devices. A controller slide 69 is mounted to reciprocate in a guideway formed in a carrier 70 and is provided at its front end with two converging cam surfaces 71 arranged to pass on opposite sides of the roll 68 when the roll is in position. The carrier 70 is mounted to turn in a bearing 72 and is provided with a rearwardly extending arm 73. The rear end of this arm is connected by a link 74 with an arm 75 secured to the rock shaft 56 which carries the blank swinging lever 55. If the roll 68 is to one side of its neutral position when the controller slide 69 is advanced, one of the inclined surfaces 71 will ride against the roll, thus swinging the carrier 70. This motion is transmitted to the lever 55, and swings the roll 57 to one side or the other of its neutral position, the roll being at this time in the broader part of the cam groove 58. The parts are so timed that this swinging or setting of the lever 55 and roll 57 occurs while the sole gripping head 27 is raised and therefore free from the blank. After the blank swinging mechanism has been thus set in accordance with the position of the feeler the head 27 is depressed to grip the sole, and immediately thereafter the inclines 60 on the cam groove 58 swing the head until the roll 57 enters the concentric portion 59 of the cam groove. The parts are so proportioned that the swinging movement imparted to the blank is the movement requisite for bringing the edge of the blank into the line of feed.

The controller slide 69 is reciprocated during each revolution of the cam shaft by a cam 76 which is secured to the cam shaft and is provided with a groove engaged by a roll on a lever 77. The end of the lever is connected with the controller slide by a link 78. When the roll 68 is positioned by the feeler it is locked in position during the advance of the controller slide by clamping balls 79 arranged to wedge between fixed surfaces 80 and a segmental surface 81 on the arm 67 which carries the roll. These balls are forced forward to lock the arm in position by springs 82, and are forced back to release the arm by levers 83. The levers are operated to effect the locking and unlocking of the roll carrying arm 67 by a wedge-shaped lug 84 formed on the under side of a slide 85. The slide is operated at proper intervals by a cam 86 secured to the cam shaft 7, and provided with a cam groove engaged by a roll on an arm 87 which is secured to a rock shaft 88. The rock shaft carries a second arm 89 which is connected by a link 90 to the slide 85. By means of the mechanism described the mechanism for swinging the sole gripping head is set in accordance with the position of the edge of the sole at the point where it is engaged by the feeler, while the head is disengaged from the sole and operates to turn the head and bring the edge of the sole at this point into proper position after the head has engaged and clamped the sole. In order that the sole may be turned more readily by the head, the feed slide 26 is provided with a rotary disk 27' the upper surface of which is flush with the upper surface of the work supporting table, and the axis of which is in line with the axis of the shaft 30. The parts are preferably so arranged that the axis of the shaft 30 and disk 27' will pass through the edge of the sole substantially in line with the point of operation of the lip setting tool when the head 27 is actuated to swing the sole, since with this arrangement the sole will be swung about the point of operation of the tools and the swinging movement will not carry the edge of the sole out of the line of feed at the point of operation.

In operating upon sole blanks it is desirable that the speed with which the sole is fed be reduced in operating about the toe, since the curvature of the sole at this point renders it impracticable to feed the sole at the high speed which is desirable when operating along the sides. The machine is accordingly provided with means for automatically slowing down the feed when operating around the toe and increasing it again to normal when the toe has been passed. Means is also provided for automatically stopping the machine. These devices are of especial value in machines in which the sole is automatically presented to the operating tools, but may also be embodied in machines in which the operator guides and controls the sole to a greater or less extent.

In the construction shown the cam shaft 7 is connected through spiral gears 91 with a shaft 92 which may be driven at either one of two speeds through gears 93 and 94. The gear 93 is a comparatively small gear, and engages a larger driving gear 95, while the gear 94 is a comparatively large gear, and engages a smaller driving gear 96. The driving gears 95 and 96 are loosely mounted on a driving shaft 97 and either one or the other may be connected to the shaft through clutches 98 and 99. When the gear 95 is connected with the driving shaft the cam shaft 7 will be driven at a high rate of speed, and when the driving gear 96 is connected with the driving shaft the driving gear will be driven at a comparatively slow rate of speed. The engagement and disengagement of the clutches is controlled by a sleeve 100 mounted upon the driving shaft and arranged to throw either one of the clutches into operation, or to occupy a position where both clutches are out of operation. The sleeve 100 is operated to start and stop the cam shaft and to vary its speed through a clutch lever 101 the front end of which is provided with arms carrying rolls 102 engaging an annular groove in the sleeve. The lever also carries a roll 103 engaging a cam groove 104 formed in the under side of a cam disk 105. The cam 105 is moved step by step through a complete revolution during the operation upon each sole, and operates to start the machine at high speed, to throw in the slow speed driving mechanism as the toe is approached, to disconnect the slow speed driving mechanism and reconnect the high speed driving mechanism after the toe has been passed, and to disconnect both driving mechanisms after the turning up and setting of the lip has been completed. The mechanism for operating and controlling the cam comprises a worm wheel 106 surrounding the hub of the cam and forming one member of a clutch, the other member of which is formed by the hub of the cam. The clutch for connecting the worm wheel and cam is a form of Horton clutch, and comprises the clutch rolls 107 arranged between the inner periphery of the worm wheel, and wedging surfaces 108 formed on the hub of the cam. The rolls are held between lugs 109 which project downward from the ring 110. The roll carrying ring is forced in a direction to wedge the rolls between the worm wheel and surfaces 108 by a spring 111, and the rolls are held in position between the lugs 109 by the springs 112. The roll carrying ring is made in two sections, each of which is provided with two radially projecting stop lugs. The lower section is provided with two lugs 113 and 114 arranged to coöperate with a stop pawl 115, and the upper section is provided with two stop lugs 116 and 117 adapted to coöperate with a stop pawl 118. The worm wheel is continuously driven through a worm 119 secured to a shaft 120 which is connected through a gear 121 and intermediate gear 122 with a gear 123 secured to the driving shaft 97.

When the machine is at rest the rolls of the Horton clutch are held out of action by the engagement of the lug 113 with the pawl 115. The machine is started by disengaging the pawl 115 from the lug, and this movement of the pawl brings the pawl 118 into the path of the lug 116, since the two pawls are connected together by a link 124. The cam will now be rotated until the lug 116 strikes the pawl 118, when the clutch will be thrown out of action and the rotation of the cam arrested. When the clutch is to be again thrown into action the pawl 118 is moved out of the path of the lug 116, and this brings the pawl 115 into the path of the lug 114, so that the rotation of the cam is again arrested when this lug engages the pawl. Thus by shifting the pawls 115 and 118 first in one direction and then in the other, the cam is given four partial revolutions in completing a single revolution.

The mechanism for shifting the stop pawls is controlled by the sole being operated upon so that the change from one speed to another, and the throwing of the machine out of operation, will be properly timed with reference to the part of the sole being operated upon. As shown, the speed changing and stopping mechanism is controlled by a controlling finger 125 arranged over the sole supporting table 22 at the proper distance in advance of the point of operation of the lip turning and setting tools. The controlling finger is secured upon a vertically movable rod 126 which is connected through a sleeve 127 with an arm 128 secured to one end of a rock shaft 129. A second arm 130 is secured to the rock shaft, and its free end is connected by a link 131 with the upper end of a lever 132. The lower end of the lever 132 is connected through a yielding connection 133 with a second lever 134. The lower end of the second lever 134 is forked to embrace a sleeve 135 which is secured to a rod 136 and is connected to the lower end of the lever by pins 137 engaging slots in the lever. An arm 138 is secured to the rod 136, and is connected by a link 139 with the stop pawl 115. A spring 140 forces the rod 136 in a direction to hold the stop pawl 115 in the path of the lugs 113 and 114, and also acts through the connections described to press the controller finger 125 toward the sole supporting table 22.

Figure 1:
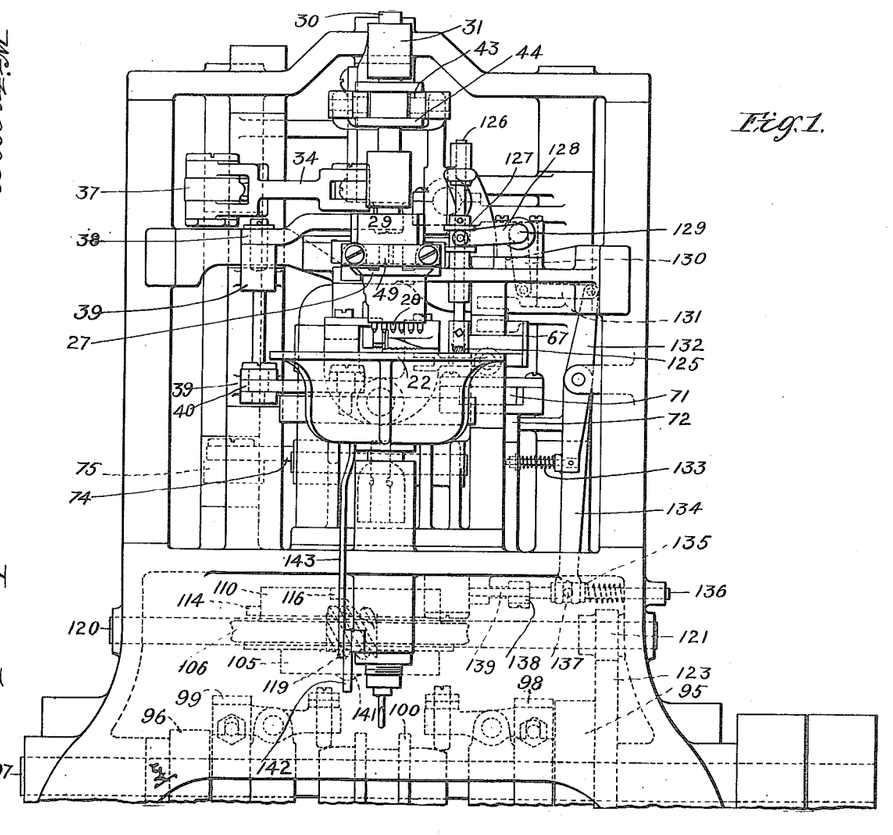
Figure 1 is a front elevation of a lip turning machine embodying the features of the invention in their preferred forms.
Figure 2:
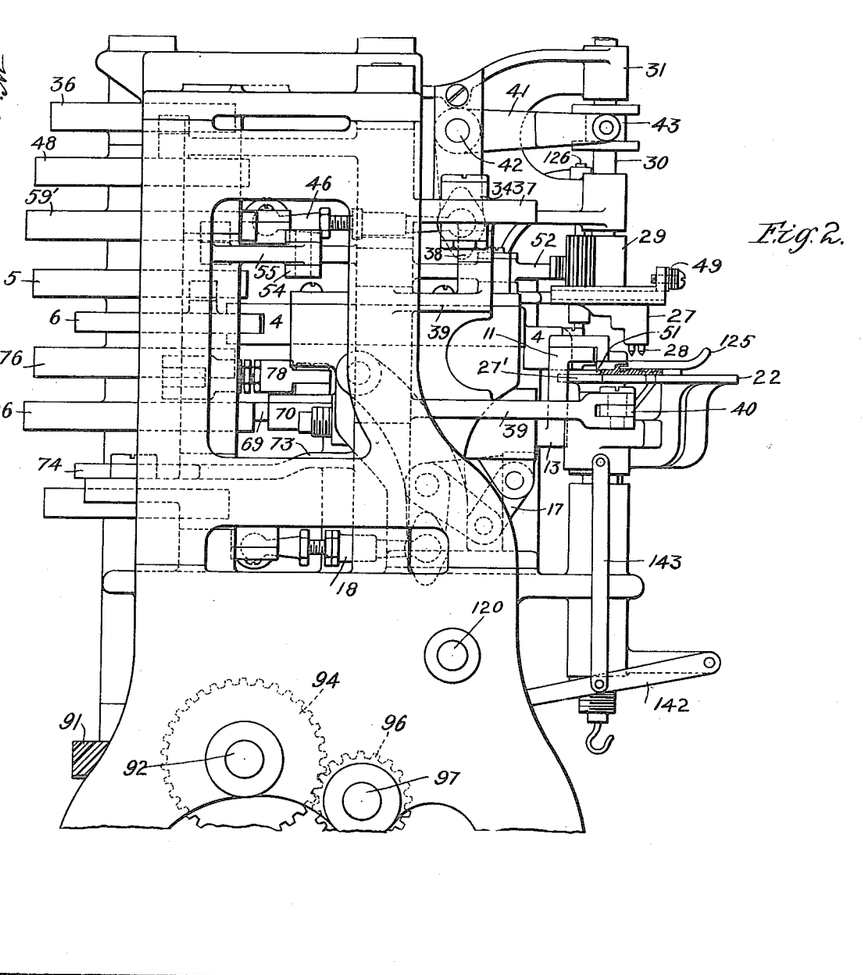
Fig. 2 is a side elevation looking toward the right in Fig. 1.
Figure 3:
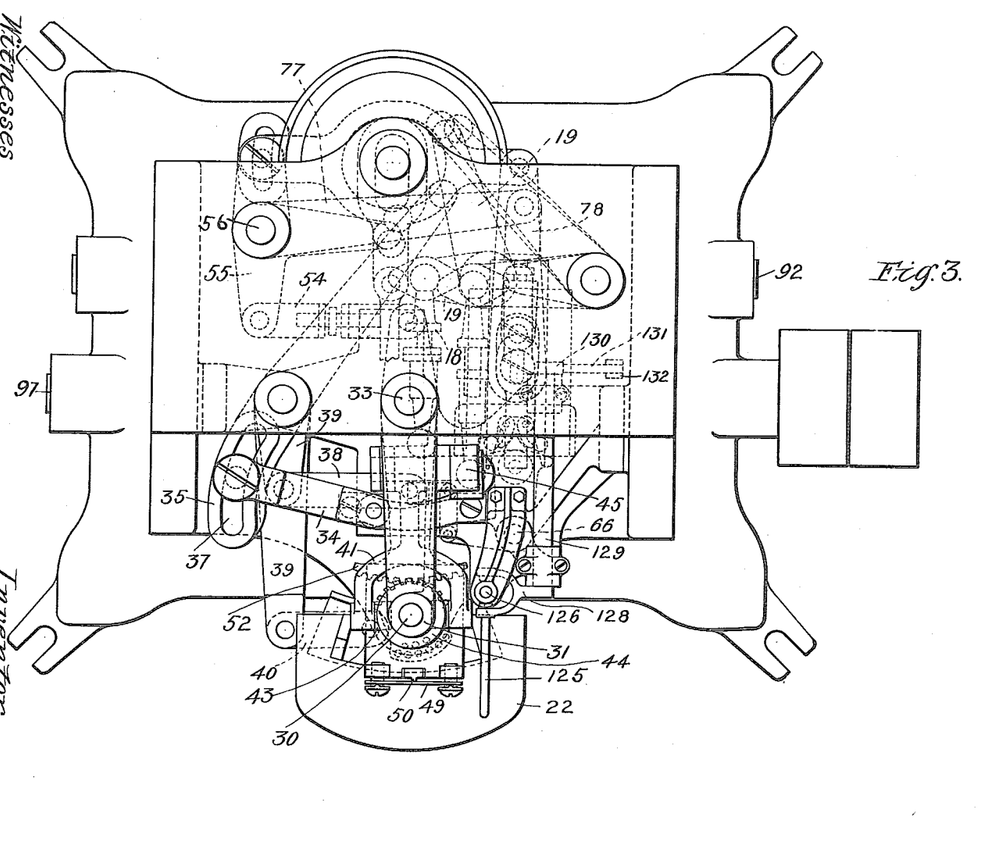
Fig. 3 is a plan view.
Figure 4:
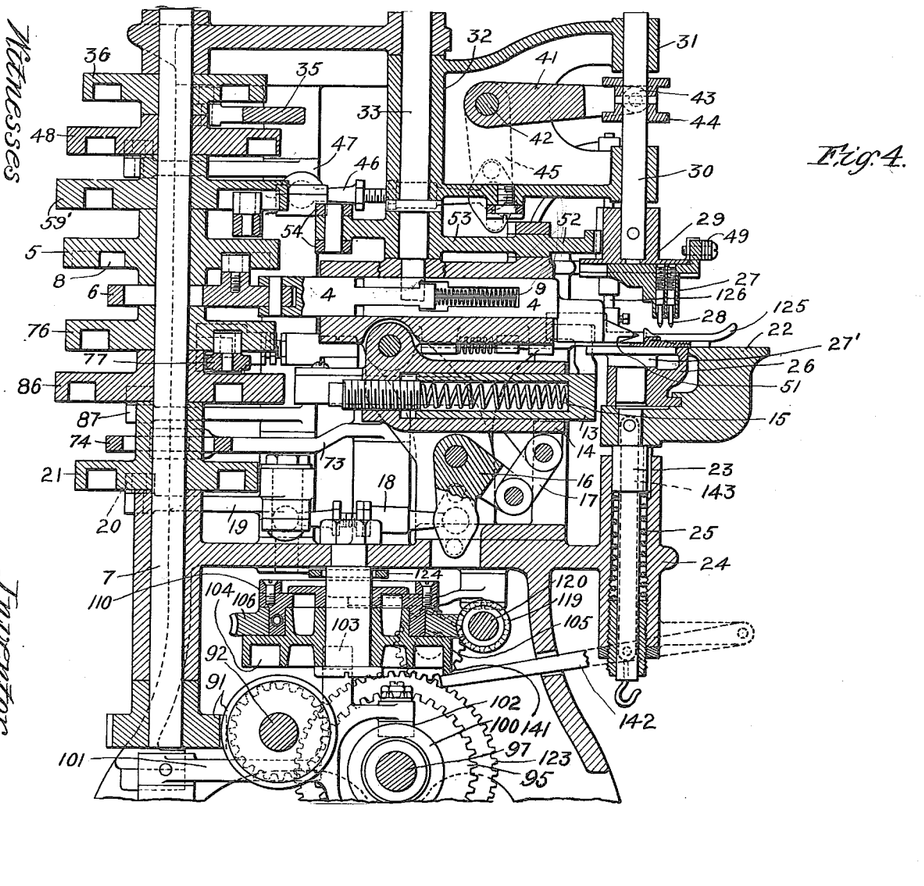
Fig. 4 is a vertical sectional view.
Figures 5, 6:
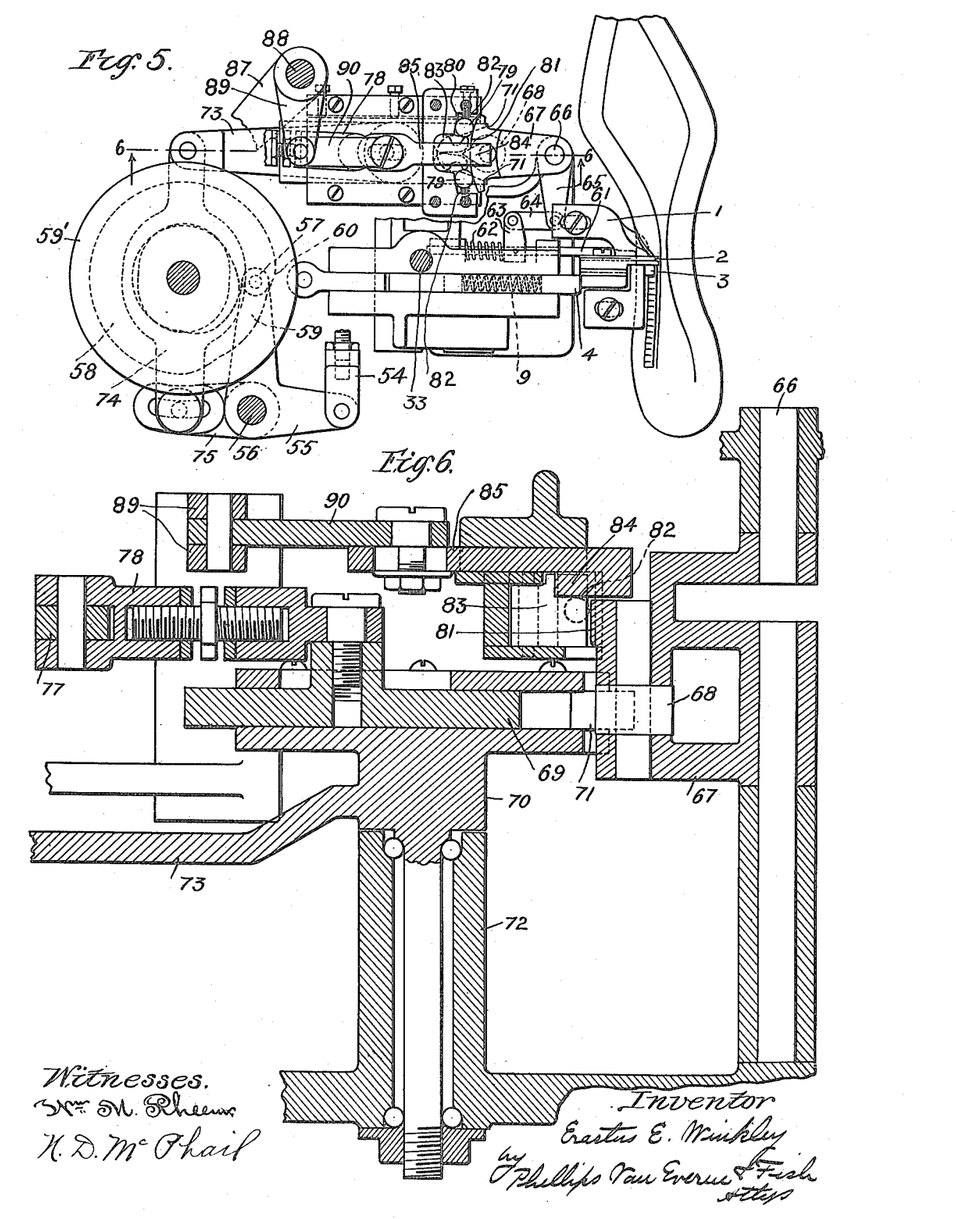
Fig. 5 is a detail plan view showing the mechanism through which the swinging of the sole is controlled.
Fig. 6 is a vertical sectional view on line 6—6, Fig. 5, showing the parts on a larger scale.
Figure 7:
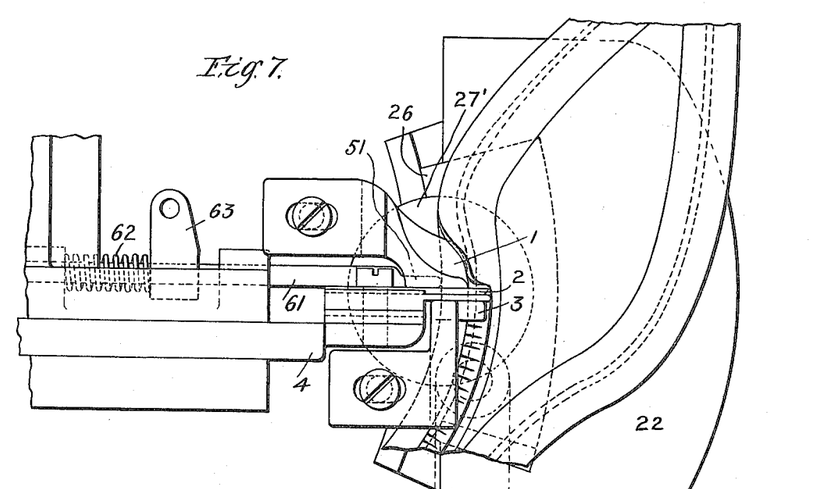
Fig. 7 is a detail plan view showing the tools for operating on the margin of the sole.
Figure 8:
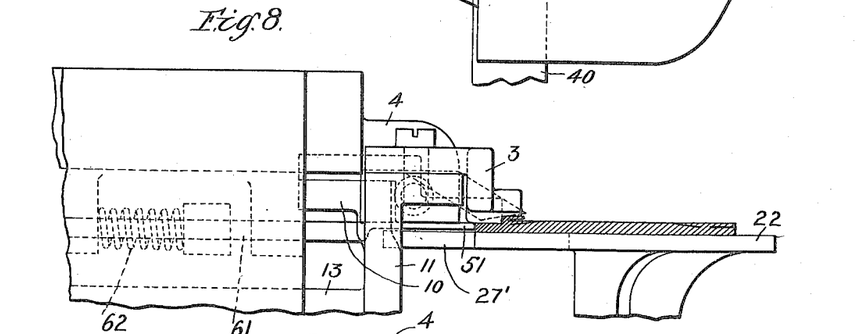
Fig. 8 is a side elevation of the parts shown in Fig. 7.
Figure 10:
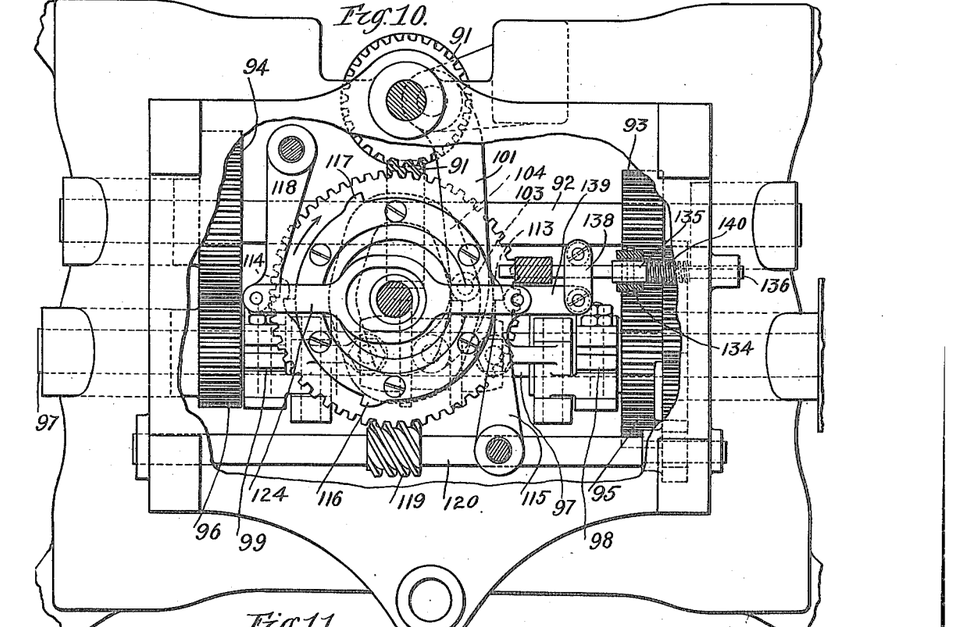
Fig. 10 is a plan view of the driving mechanism of the machine.
Figure 11:
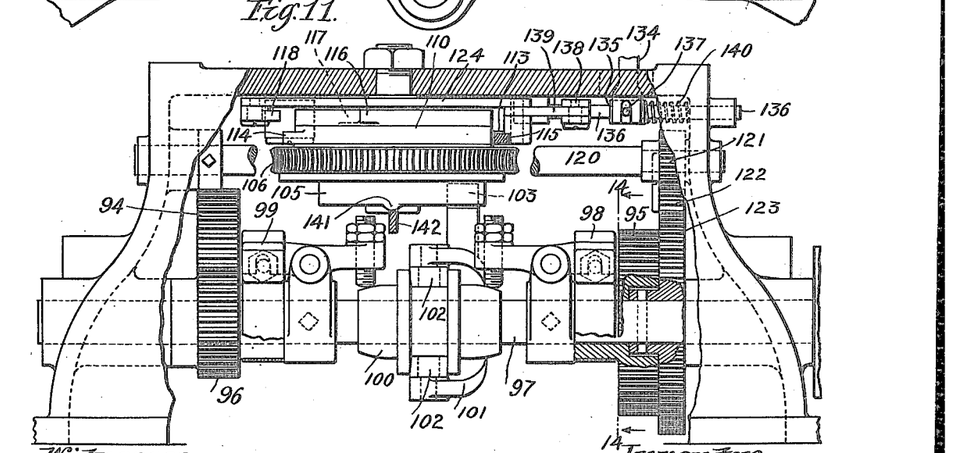
Fig. 11 is a front elevation of this mechanism.
Figure 12:
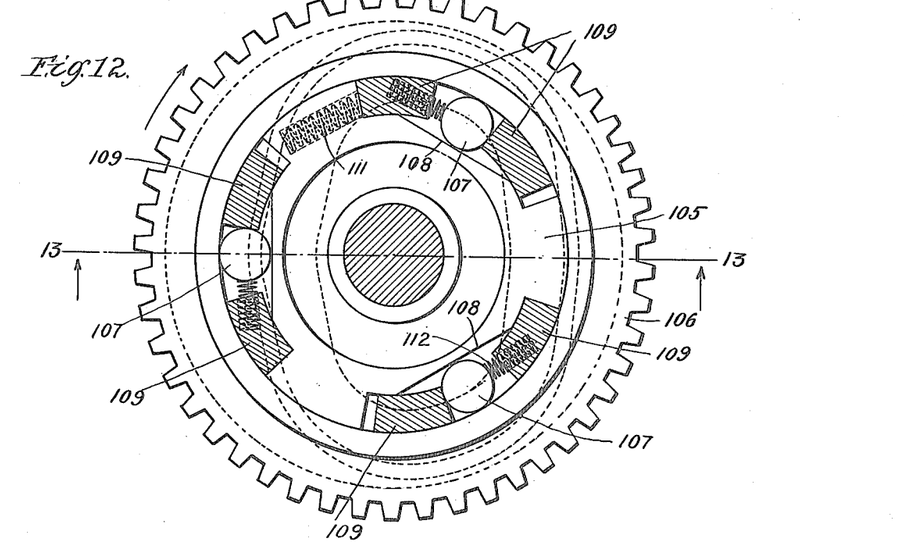
Fig. 12 is a detail sectional view on line 12—12, Fig. 13, showing one of the clutches of the driving mechanism.
Figure 13:
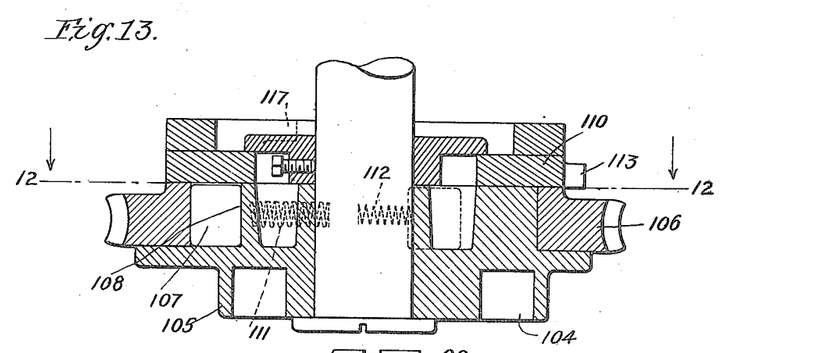
Fig. 13 is a sectional view on line 13—13, Fig. 12.
Figure 14:
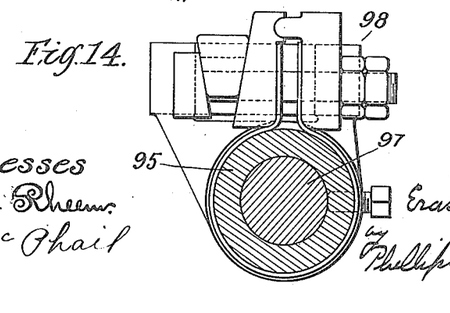
Fig. 14 is a sectional view on line 14—14, Fig. 11, showing the detail of one of the driving clutches.

The parts are normally in the position indicated in Figs. 1, 10 and 11. At this time both driving clutches are out of operation, and the pawl 115 is in engagement with the lug 113 and is holding the cam operating the clutch out of action. When the sole is placed in position upon the work supporting table it passes under the finger 126 and raises the finger so that the pawl 115 is withdrawn from the path of the cam 113. This throws the cam operating clutch into operation, and the cam 105 is rotated until it is again thrown out of action by the engagement of the lug 116 with the stop pawl 118. This movement of the cam throws the high speed driving clutch 98 into operation. The finger 125 rides along the upper surface of the sole until the toe approaches the lip turning and setting tools. The finger then drops off the toe end of the sole. This shifts the stop pawls so that the pawl 118 is disengaged from the lug 116 and pawl 115 is moved into the path of lug 114. The cam 105 is now given a second partial revolution, and the cam groove 104 acts to shift the clutch sleeve 100 to disengage the high speed driving clutch and gear, and throw the low speed driving clutch and gear into operation. During the operation of the tools about the toe the sole is therefore fed at a comparatively slow speed. The sole is swung through nearly 180° in passing around the toe, and the swinging of the sole brings the sole again under the controller finger 125 and lifts the finger. This shifts the stop pawl 115 out of the path of the lug 114, and brings the pawl 118 into the path of the lug 117. The cam 105 is now given another partial revolution and operates to shift the driving clutch to throw out the slow speed driving clutch and gearing and throw into operation the high speed driving clutch and gearing. The operation of the tools now progresses along the other side of the sole until the end of the feather at the breast of the heel is reached, when the finger 125 drops off the heel end of the sole. This movement of the finger again shifts the stop pawls, disengaging the pawl 118 from the lug 117, and bringing the pawl 115 into the path of the lug 113. The clutch operating cam is now given a partial revolution, and operates to move the sleeve 100 into neutral position, thus throwing the high speed driving clutch and gear out of operation and stopping the rotation of the cam shaft. The sole may now be removed and a new sole inserted, when the cycle of operations is repeated.

When the machine is arrested the work supporting table may be moved downward slightly against the tension of the spring 125 to relieve the pressure on the sole, so that it may be easily removed. For this purpose the cam disk 104 is provided with a depending lug 141 arranged to engage the end of a lever 142 which is connected through a link 143 with the work supporting table. This cam lug operates to slightly depress the work supporting table when the operation of the machine is stopped, and acts to release the table and allow it to press the sole firmly against the operating tools before the driving clutch is thrown into operation in starting the machine.

While the invention has been shown and described as embodied in a machine for turning up and setting the lip of an insole, it will be understood that except so far as specified in the claims the invention is not limited to a machine for performing this operation, but may be embodied in machines for preforming various other operations upon the marginal portion of a flat sole blank.

Having explained the nature and object of the invention, and specifically described one form of machine in which it may be embodied, what I claim is:—

1. A machine for operating on shoe soles, having, in combination, a tool for operating on the marginal portion of a sole blank, and means for presenting the blank to the tool including devices for intermittently gripping the flat surfaces of the blank and swinging the blank to maintain its marginal portion in proper relation to the tool, substantially as described.

2. A machine for operating on shoe soles, having, in combination, a tool for operating on the marginal portion of a sole blank, and means acting progressively on the blank for presenting it to the tool including sole gripping devices and mechanism for actuating the devices to intermittently grip the blank and for turning the devices to swing the blank, substantially as described.

3. A machine for operating on shoe soles, having, in combination, devices for operating on the marginal portion of a sole blank including means for feeding the blank, and mechanism for actuating the feeding means to maintain the marginal portion of the blank in proper relation to the operating devices as the point of operation progresses along the marginal curves of the blank, substantially as described.

4. A machine for operating on shoe soles, having, in combination, means for operating on the marginal portion of a sole blank, sole gripping devices, and mechanism for actuating the sole gripping devices to intermittently grip and to feed the blank and for turning the devices to swing the blank, substantially as described.

5. A machine for operating on shoe soles, having, in combination, means for operating on the marginal portion of a sole blank including sole. gripping devices, mechanism for actuating said devices to intermittently grip and feed the sole, and mechanism controlled by a contour on the sole for actuating said devices to swing the sole to maintain the contour in the line of feed, substantially as described.

6. A machine for operating on shoe soles, having, in combination, means for operating on the marginal portion of a sole blank, sole gripping devices, mechanism for actuating said devices to intermittently grip the sole, and mechanism controlled by a contour on the blank for actuating said devices to swing the blank to maintain the contour adjacent to the point of operation in proper relation to the operating means, substantially as described.

7. A machine for operating on shoe soles, having, in combination, means for operating on the marginal portion of a sole blank including means for feeding the blank, and mechanism controlled by a contour on the sole for actuating the feeding devices to swing the sole to maintain the contour in the line of feed, substantially as described.

8. A machine for operating on shoe soles, having, in combination, means for operating on a sole blank including means for feeding the blank, and mechanism controlled by a contour on the blank for actuating the feeding means to maintain the contour adjacent to the point of operation in the line of feed, substantially as described.

9. A machine for operating on shoe soles, having, in combination, means for operating on the marginal portion of a sole blank, sole gripping devices acting progressively on the sole, a feeler engaging the edge of the blank, and mechanism controlled by the feeler for actuating the gripping devices to maintain the edge of the sole adjacent to the point of engagement of the feeler in the line of feed, substantially as described.

10. A machine for operating on shoe soles, having, in combination, means for operating on the marginal portion of a sole blank, a sole support, a sole gripping device arranged over the sole support adjacent to the operating means to act progressively on the sole, and mechanism for actuating the sole gripping devices to intermittently grip the blank and for turning the devices to swing the sole to maintain its marginal portion at the point of operation in proper relation to the operating means, substantially as described.

11. A machine for operating on shoe soles, having, in combination, means for operating on the marginal portion of a sole blank, a sole support, a sole gripping device arranged over the sole support adjacent to the operating means, and mechanism for operating the gripping device to intermittently grip and to feed and for turning the devices to swing the blank to transfer the point of operation of the operating means around the sole, substantially as described.

12. A machine for operating on shoe soles, having, in combination, means for operating on the marginal portion of a sole blank, a sole support, a sole gripping head above the support, mechanism for giving the head a 4-motion movement, a feeler acting along a contour on the sole, and mechanism controlled by the feeler to swing the head in accordance with the contour, substantially as described.

13. A machine for operating on shoe soles, having, in combination, means for operating on the marginal portion of a sole blank, a sole support provided with a reciprocating feed plate, a sole gripping head above the feed plate, mechanism for giving the head a 4-motion movement, a feeler acting along a contour on the sole, and mechanism controlled by the feeler to swing the head in accordance with the contour, substantially as described.

14. A machine for operating on shoe soles, having, in combination, means for operating on the marginal portion of a sole blank, a sole support, a sole gripping head above the suppor provided with independently yielding spring pins for engaging the sole, and mechanism for giving the head a 4-motion movement to feed the sole, substantially as described.

15. A machine for operating on shoe soles, having, in combination, means for operating on the marginal portion of a sole blank, a sole support, a sole gripping head above the support, mechanism for intermittently raising and depressing the head, a feeler acting along the edge of the sole, and mechanism controlled by the feeler to swing the head, substantially as described.

16. A machine for operating on shoe soles, having, in combination, mechanism for operating on the marginal portion of a sole blank, a sole support, a sole gripping head, mechanism for intermittently raising and depressing the head, a feeler acting along the edge of the sole, mechanism controlled by the feeler for turning the head when raised, and mechanism for returning the head to initial position when engaged with the blank, substantially as described.

17. A machine for operating on shoe soles, having, in combination, means for controlling the feed of a sole blank from its periphery, and means operating upon the marginal portion of the blank mounted to yield crosswise of the blank, substantially as described.

18. A machine for operating on shoe soles, having, in combination, means for feeding a sole blank and controlling the path of travel of its marginal portion by its edge, and devices for operating along a marginal contour on the blank which varies from the contour of the sole edge mounted to yield crosswise of the sole, substantially as described.

19. A machine for operating on shoe soles, having, in combination, sole feeding means for feeding the edge of the sole through a fixed point at the point of operation, and lip turning tools mounted to move crosswise of the sole blank held yieldingly against the base of the lip, substantially as described.

20. A machine for operating on shoe soles, having, in combination, sole feeding means for feeding the edge of the sole through a fixed point at the point of operation, lip turning tools held yieldingly against the base of the lip, a lip setting tool, and mechanism for reciprocating the lip setting tool, including a yielding connection, substantially as described.

21. A machine for operating on shoe soles, having, in combination, a sole support, a lip turning tool above the support, reciprocating sole feeding devices for intermittently feeding the sole, and mechanism for pressing the lip turning tool against the feather on the sole during the return stroke and for relieving the pressure during the feeding stroke of the feeding devices, substantially as described.

22. A machine for operating on shoe soles, having, in combination, a sole support provided with a reciprocating feed plate, a sole gripping head above the feed plate, mechanism for giving the head a 4-motion movement to intermittently grip and feed the sole, a lip turning tool, and mechanism for pressing the turning tool against the feather on the sole during the return stroke and for relieving the pressure during the feeding stroke of the head and feed plate, substantially as described.

23. A machine for operating on shoe soles, having, in combination, devices engaging progressively the marginal portion of a sole blank including means for feeding the blank and for operating on the blank as successive portions are presented thereto, and mechanism controlled by the blank for slowing down the feed while operating around the toe, substantially as described.

24. A machine for operating on shoe soles, having, in combination, devices for engaging progressively the marginal portion of a sole blank including means for feeding the blank and for operating on the blank as successive portions are presented thereto, and mechanism controlled by the blank for slowing down the feed while operating around the toe and for stopping the machine when the point of operation has progressed to a predetermined point on the blank, substantially as described.

25. A machine for operating on shoe soles, having, in combination, devices engaging progressively the marginal portion of a sole blank before it is attached to a shoe including means for feeding the blank and for operating on the blank as successive portions are presented thereto, and mechanism acting automatically to slow down the feed while operating around the toe, substantially as described.

26. A machine for operating on shoe soles, having, in combination, devices engaging progressively the marginal portion of a sole blank including means for feeding the blank and for operating on the blank as successive portions are presented thereto, and mechanism acting automatically to slow down the feed while operating around the toe and to stop the machine when the point of operation has progressed to a predetermined point on the blank, substantially as described.

27. A machine for operating on shoe soles, having, in combination, devices engaging progressively the marginal portion of a sole blank including means for feeding the blank and for operating on the blank as successive portions are presented thereto, and mechanism controlled by the blank for starting the operation of said devices upon the introduction of the blank, for slowing down the feed while operating about the toe, and for arresting the operation of said devices when the point of operation has progressed to a predetermined point on the blank, substantially as described.

28. A machine for operating on shoe soles, having, in combination, devices engaging progressively the marginal portion of a sole blank including means for feeding the blank and for operating on the blank as successive portions are presented thereto, and mechanism controlled by the blank for starting the operation of said devices upon the introduction of the blank and for arresting the operation of said devices when the point of operation has progressed to a predetermined point on the blank, substantially as described.

29. A machine for operating on shoe soles, having, in combination, devices engaging progressively the marginal portion of a sole blank including means for feeding the blank and for operating on the blank as successive portions are presented thereto, actuating mechanism for said devices, a controlling finger arranged to ride on the blank in advance of the point of operation, and mechanism controlled by the finger to slow down the actuating mechanism when the finger rides off one end of the blank and to arrest the actuating mechanism when the finger rides off the other end of the blank, substantially as described.

30. A machine for operating on shoe soles, having, in combination, devices engaging progressively the marginal portion of a sole blank including means for feeding the blank and for operating on the blank as successive portions are presented thereto, driving mechanism for actuating said devices, a finger arranged to ride on the blank in advance of the point of operation, and mechanism controlled by the finger to throw the driving mechanism out of operation after the finger has twice ridden off the blank, substantially as described.

31. A machine for operating on shoe soles, having, in combination, devices engaging progressively the marginal portion of a sole blank including means for feeding the blank and for operating on the blank as successive portions are presented thereto, driving mechanism for actuating said devices at high or low speed, a finger arranged to ride on the blank in advance of the point of operation, and mechanism controlled by the rise and fall of the finger to start the machine at high speed when the finger is raised by the introduction of the blank, to reduce the speed when the finger rides off the toe, to restore the high speed when the finger is again raised by the blank, and to stop the machine when the finger rides off the heel, substantially as described.

32. A machine for operating on shoe soles, having, in combination, devices engaging progressively the marginal portion of a sole blank including means for feeding the blank and for operating on the blank as successive portions are presented thereto, driving mechanism for actuating said devices, a finger arranged to ride on the blank in advance of the point of operation, and mechanism controlled by the finger to stop the machine after the finger has twice passed off the blank, substantially as described.

33. A machine for operating on shoe soles, having, in combination, means for operating on the marginal portion of a sole blank, sole gripping devices arranged to act progressively on the sole adjacent to the operating means, a feeler engaging a marginal contour on the sole, and mechanism controlled by the feeler for swinging the gripping devices in accordance with the contour, substantially as described.

34. A machine for operating on shoe soles, having, in combination, means for operating on the marginal portion of a sole blank including means for feeding the sole, sole gripping devices, mechanism for actuating the devices to grip and release the sole, a feeler acting along a contour of the sole, and mechanism controlled by the feeler to swing the gripping devices in accordance with the contour, substantially as described.

ERASTUS E. WINKLEY.

Witnesses:
A. C. RICHARDSON,
N. D. McPHAIL.